Oct. 24, 1950  J. M. ANDREWS  2,526,924
CURRENT INRUSH CONTROL
Filed May 4, 1949  2 Sheets-Sheet 1

Inventor
John M. Andrews
By Dodge and Ins
Attorneys

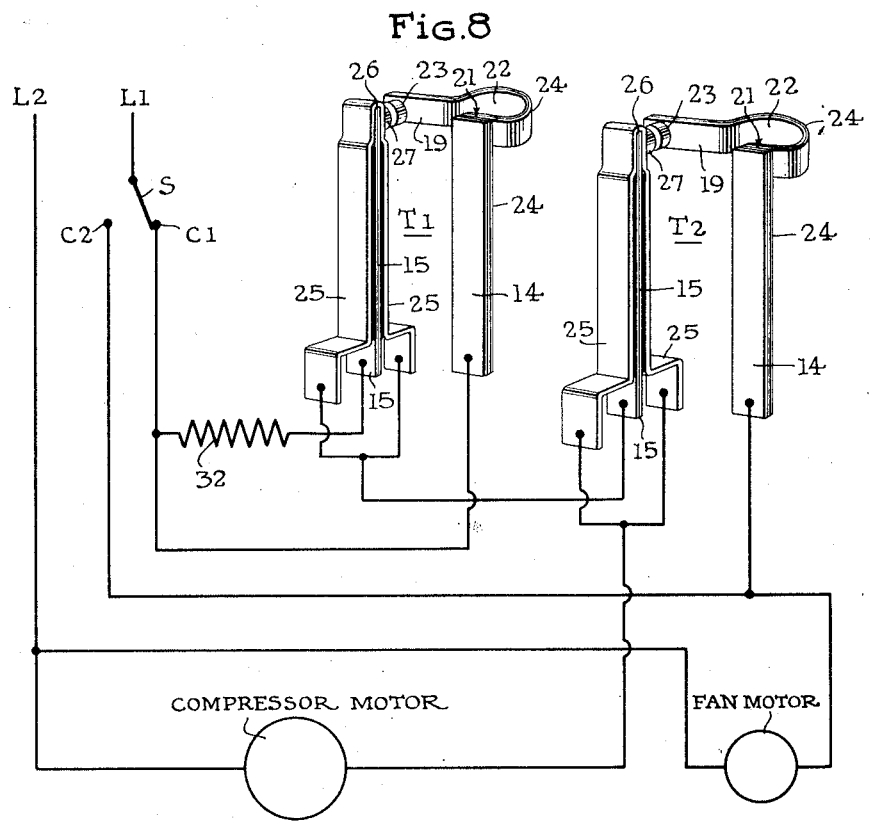

Patented Oct. 24, 1950

2,526,924

UNITED STATES PATENT OFFICE 2,526,924

CURRENT INRUSH CONTROL

John M. Andrews, York, Pa., assignor to York Corporation, York, Pa., a corporation of Delaware Application May 4, 1949, Serial No. 91,381

2 Claims. (Cl. 318—399)

This invention relates to starting devices for electric motors and offers a simple, self-contained device for starting motors used in domestic and office appliances. An air conditioner will be discussed as a typical example.

There is a trend to larger motors say ½ to 1 H. P. which start under load or under partial load. Until these motors start to turn and build up a considerable back E. M. F., the inrush current is considerable, so that lights and other apparatus fed by the same lines are adversely affected.

Many air conditioners use separate motors to drive the compressor and to operate fans. The invention can be used to start such motors serially, say first the compressor motor with protective resistance which is shunted out after a suitable interval, and then the fan motor.

Larger conditioner units now coming into use have two compressor motors each driving its own compressor. The invention can be used to start the motors serially, so that the starting inrush of the first ends before that of the second commences.

This invention uses a thermostatically operated switch, heated by current flowing in the motor circuit, to control the shunt, and this switch is thermostatically compensated so that its timing is stable, regardless of the temperature of its environment, at least within reasonable limits.

This feature is particularly important when the compressors must be started and stopped automatically in response to conditions in the conditioned space. The temperature of the machinery space will then vary widely and since the starting mechanism is desirably located near the motors, indifference to local temperature is important. The device is obviously available for use with either A. C. motors or D. C. motors.

The thermostatic switch is heated by current flowing to the motor and as arranged is not affected by voltage variations. To increase the sensitiveness of the thermostatic switch, minimize the current used to heat it and reduce arcing the thermostat and its heater are enclosed in a glass envelope or tube filled with an inert gas.

The invention will now be described by reference to the accompanying drawings, in which:

Fig. 8 is a diagram of the starting circuit using the device shown in Fig. 6.

Refer first to Figs. 1 to 5 inclusive. An inverted T-shaped supporting member 11 carries the entire thermostatic switch mechanism. It is formed of any suitable insulating material, for example, porcelain. The member 11 is sustained within the envelope tube, such as either of the tubes 12 shown in Fig. 6, by two bow springs 13 which are slightly compressed when the unit is inserted into the tube 12 and which are adequate to sustain the member 11 and all parts supported thereby.

Figure 2:
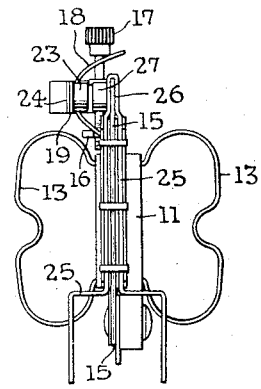
Fig. 2 is a right side elevation thereof.

As best shown in Fig. 2 the springs 13 are connected at their ends with the stem of the T-shaped member 11. Mounted on respective laterally projecting arms of the T-shaped member 11, are two similar bi-metallic bars 14 and 15. At least the lower ends of the bars are supported in a common plane. These two bars extend upward from the cross arm of the T. They are similar in the sense that they both flex in the same direction from their common plane upon similar changes in temperature, so that when they are subjected to the same temperature changes they flex similarly and their upper free ends move equally and in the same direction from their common plane.

Figure 5:
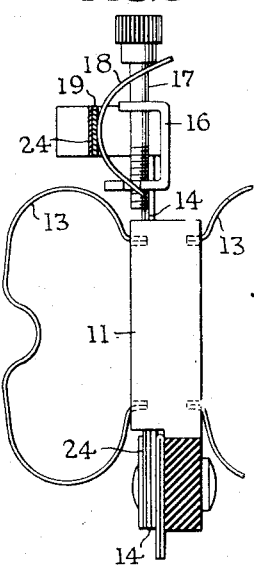
Fig. 5 is an enlarged section on the line 5—5 of Fig. 1 showing the means for adjusting the control point.
Figure 4:
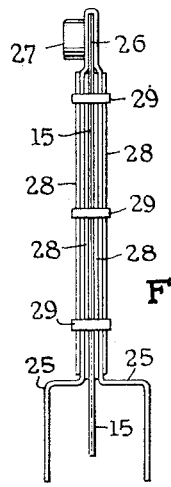
Fig. 4 is an enlarged side elevation of the main thermostatic unit and the associated heater element.

The bar 14 carries at its upper end a laterally offset bracket 16 which is U-shaped in form and receives a threaded adjusting screw 17 (see Fig. 5). This screw 17 can be turned to flex, to the desired extent, an arcuate leaf spring 18. The leaf spring 18 reacts against a resilient contact-carrying arm 19. The arm 19 is attached at 21 to the upper end of the bi-metallic bar 14, is formed with a flexible loop 22 and terminates in a contactor 23. Consideration of Figs. 3 and 5 will make it clear that the position of the contact 23 with reference to the point of attachment 21 at the upper end of the bar 14 may be adjusted by turning the screw 17.

The thermostatic bar 14 is merely a compensating bar intended to respond to ambient temperature. For this reason a low resistance copper conductor 24 leads along the bar 14 and the resilient member 19 to the contact 23 and has no appreciable electrical heating effect.

The thermostatic bar 15 is, however, heated by the current flowing to the motor. The heater element which has a resistance of say 0.037 ohm takes the form of a strip 25 which extends up one side of the thermostatic bar 15 and down the other and is electrically connected with the bar at 26 where a contact element 27 is attached. The contact element 27 coacts with the contact 23, and is spaced therefrom except when bar 15 is electrically heated by strip 25.

Below the connection 26 the heater strip 25 is electrically insulated. The insulation takes the form of four mica strips 28 (see Fig. 4), the inner ones of which are interposed between the strip 25 and the bar 15 and the outer ones of which overlie the strip 25 (see Fig. 4). The mica strips are wider than the bar 15 and the heater strip 25 and are clamped in place by encircling bands 29.

The effect of this construction is to insulate the two runs of strip 25 from each other and from the bi-metallic bar 15 at all points below the electrical connection 26 already described.

The circuit connections, which will be hereinafter explained, are such that when current flows to the motor, it will pass through the heater strip 25 and by causing this strip to heat will heat the bi-metallic bar 15. The resulting flexure of the bi-metallic bar 15 will cause contact 27 to close against contact 23 and thus establish a shunt around the current limiting resistor, now about to be described.

Figure 6:
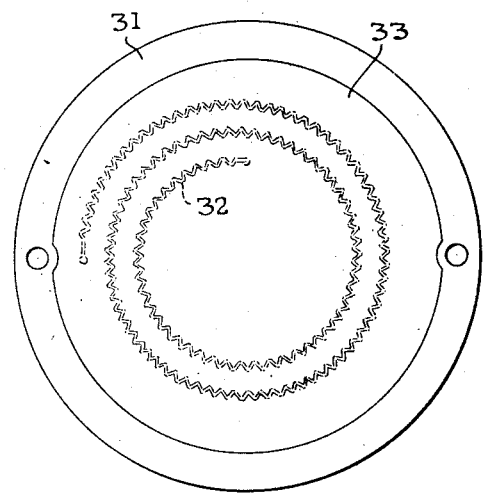
Fig. 6 is a view part in section and part in elevation showing two thermostat units (including the glass envelopes) mounted on a single base in which the main resistor is enclosed.
Figure 1:
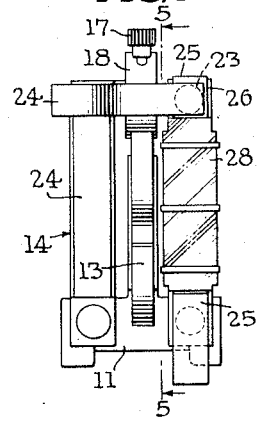
Fig. 1 is a front elevation of the thermostatic switch assembly without the glass envelope.
Figure 3:
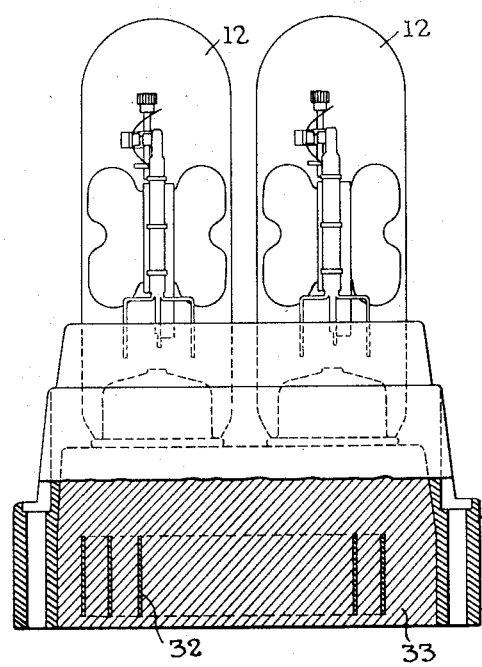
Fig. 3 is a plan view thereof.

Two or more "tubes" each comprising a glass envelope 12 enclosing a compensated thermostatic switch unit such as that shown in Figs. 1-3 may be mounted in a base which encloses the resistor or resistors. Fig. 6 shows a base with one resistor and two tubes.

Figure 7:
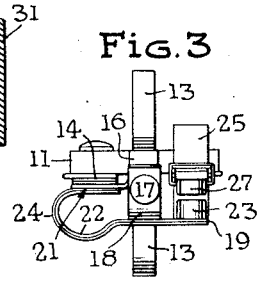
Fig. 7 is a bottom view of the base shown in Fig. 6 indicating in dotted lines the configuration of the resistor.

The base 31 comprises a porcelain or other shell formed at its top with sockets for the desired number of tubes. The tubes are cemented in their sockets. The resistor 32, whose spiral form is indicated in Figs. 6 and 7 is embedded in a plastic insulating filling 33 in the lower portion of base 31, as are various connections which it is not practicable to illustrate.

The connections for a two-tube unit such as is shown in Fig. 6 are diagrammed in Fig. 8.

Refer to Fig. 8. The compressor motor and the fan motor of an air conditioner are indicated by legends. These may, however, typify any two motors which can be started serially.

The supply lines are indicated at L1 and L2. The switch S when closed against contact C2 simply starts (without inrush protection) the relatively small fan motor. When switch S is closed against contact C1, the motors are serially started. Two similar thermostatic switch units generally indicated by T1 and T2 are shown and they are so adjusted that T2 requires a relatively higher temperature than does T1 to cause its contacts 23 and 27 to close. Hence they close later.

When switch S is closed against contact C1 the circuit is from L1 through contact C1, resistor 32, bar 15 and heater 25 of T1, bar 15 and heater 25 of T2, the compressor motor to L2. When contacts 23 and 27 of T1 close, the heater 25 of T1 is kept in circuit, but resistance 32 is shunted. When contacts 23 and 27 of T2 later close, a circuit parallel to that through the compressor motor is established through the fan motor.

While a preferred thermostatic switch has been described and illustrated in detail, no limitation to this construction is implied except as is expressed in the appended claims.

I claim:

1. The combination of a first and a second motor circuit arranged in parallel; switch means common to both circuits for controlling the supply of energy thereto; a starting resistor in the first motor circuit; a normally interrupted shunt path around said resistor; a thermostatic switch arranged to bridge said interruption in response to rise of temperature; a second thermostatic switch interposed in the second motor circuit, said switch being normally open and arranged to close in response to rise of temperature; and resistance heating means interposed in the first motor circuit and arranged to heat both thermostatic switches, said heating means and switches being so arranged that the first and second thermostatic switches close successively.

2. The combination of a first and a second motor circuit arranged in parallel; switch means common to both circuits for controlling the supply of energy thereto; a starting resistor in the first motor circuit; a normally interrupted shunt path around said resistor; a thermostatic switch arranged to bridge said interruption when closed and arranged to close on temperature rise; a resistance heater interposed in said first circuit and arranged to heat said thermostatic switch; a normally open thermostatic switch set to close at a temperature higher than that at which the first thermostatic switch closes, and interposed in the second motor circuit; and a second resistance heater interposed in the first motor circuit and arranged to heat the second thermostatic switch.

JOHN M. ANDREWS.

REFERENCES CITED

The following references are of record in the file of this patent:

UNITED STATES PATENTS

| Number | Name | Date |
|---|---|---|
| 1,552,235 | Russell | Sept. 1, 1925 |
| 2,116,858 | Winckler | May 10, 1938 |
| 2,185,130 | Morrill et al. | Dec. 26, 1939 |
| 2,303,153 | Woodworth | Nov. 24, 1942 |